United States Patent
Hertz et al.

(10) Patent No.: US 10,760,638 B2
(45) Date of Patent: Sep. 1, 2020

(54) VIBRATION DAMPER WITH A HYDRAULIC END STOP

(71) Applicant: ZF Friedrichshafen AG, Friedrichshafen (DE)

(72) Inventors: Wolfgang Hertz, Sankt Augustin (DE); Stefan Steines, Eitorf (DE); Monika Ahr, Eitorf (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 16/414,100

(22) Filed: May 16, 2019

(65) Prior Publication Data

US 2019/0353221 A1  Nov. 21, 2019

(30) Foreign Application Priority Data

May 18, 2018  (DE) .......................... 10 2018 207 911

(51) Int. Cl.
  *F16F 9/49*  (2006.01)
  *F15B 15/24*  (2006.01)
  *F16F 9/10*  (2006.01)

(52) U.S. Cl.
  CPC .............. *F16F 9/49* (2013.01); *F16F 9/103* (2013.01)

(58) Field of Classification Search
  CPC ... F15B 15/24; F16F 9/36; F16F 9/362; F16F 9/49; G06F 30/23
  USPC ....... 188/322.16–322.19; 277/560, 572, 573; 285/330; 403/344, 345, 355; 92/168
  See application file for complete search history.

(56) References Cited

U.S. PATENT DOCUMENTS

| | | | |
|---|---|---|---|
| 4,852,703 A | 8/1989 | Nishimoto | |
| 8,127,902 B2* | 3/2012 | Pasino | G06F 30/23 188/322.17 |
| 8,490,763 B2* | 7/2013 | Vandine | F16F 9/0218 188/322.15 |
| 9,593,697 B2* | 3/2017 | Baalmann | F16F 9/49 |
| 9,822,837 B2* | 11/2017 | Groves | B60G 15/068 |

FOREIGN PATENT DOCUMENTS

| | | |
|---|---|---|
| DE | 102004008956 | 9/2005 |
| DE | 102011089140 | 3/2013 |
| DE | 102014223480 | 5/2016 |
| DE | 112016000630 | 11/2017 |

* cited by examiner

*Primary Examiner* — Christopher P Schwartz
(74) *Attorney, Agent, or Firm* — Cozen O'Connor

(57) ABSTRACT

A vibration damper with a hydraulic end stop includes a cylinder in which a sleeve of plastic is axially fixed as part of the end stop. The sleeve has a circumferential collar on the outer side, via which collar the sleeve is axially supported at the cylinder side. The sleeve is supported via the circumferential collar directly on a carrying ring which has an L-shaped cross section and is axially clamped between an end face at the end of the cylinder and a piston rod guide of the vibration damper.

9 Claims, 3 Drawing Sheets

VIBRATION DAMPER WITH A HYDRAULIC END STOP

BACKGROUND OF THE INVENTION

1. Field of the Invention

The present invention is directed to a vibration damper with hydraulic end stop.

2. Background of the Invention

U.S. Pat. No. 9,593,697 is directed to a vibration damper with a hydraulic end stop having a plastic sleeve which is secured inside of a cylinder. This securing is effected via a radially circumferential collar which is clamped between an end face of the cylinder and an underside of a piston rod guide.

When a sealing ring on the piston rod side moves into a control space, the pressure in a control chamber increases in an extreme manner in some cases. Accordingly, the pressure exerts a large axial force on the end face of the plastic sleeve facing in direction of the piston rod guide, and this axial force cannot be compensated by the pressure in a working chamber remote of the piston rod on the opposite end space of the plastic sleeve. Consequently, a shear force acts on the circumferential collar such that the plastic sleeve can be pushed out of its anchoring.

In the sleeve according to DE 10 2014 223 480 A1, this defect cannot occur because the sleeve is made from a metal material. As a rule, a metal sleeve is substantially more expensive and less adaptable with respect to the geometric configuration of grooves for a soft increase in damping force.

DE 10 2004 008 956 A1 describes a hydraulic end stop with a plastic sleeve which is fixed in the cylinder simply by means of an interference fit. A circumferential collar is not provided. A radial channel is provided in the plastic sleeve between the control chamber and at least one axial channel between an outer lateral surface and an inner wall of the cylinder so that the maximum pressure in the control chamber is limited by the throttling effect of the radial channel.

It is an object of the present invention to further develop a vibration damper with a hydraulic end stop such that the required life of a plastic sleeve is ensured.

SUMMARY OF THE INVENTION

The above-stated object is met in that the sleeve is supported via the circumferential collar directly on a carrying ring which has an L-shaped cross section and is axially clamped between an end face at the end of the cylinder and a piston rod guide of the vibration damper.

The carrying ring provides for a clamping chain between the piston rod guide and the cylinder. The cylinder can be constructed as a simple tube without special machining steps. In spite of the supporting surface for the collar of the sleeve, there remains a sufficiently large contact surface with respect to the piston rod guide and the end face of the cylinder as a result of the L-shape.

In a further advantageous configuration, the collar and the carrying ring have contact surfaces extending in a plane-parallel manner. The plane-parallel contact surfaces extend substantially perpendicular to the longitudinal axis of the vibration damper and therefore offer a reliable positive engagement which reliably holds the end face oriented in direction of the piston rod guide even under greater compressive loads.

For the assembly phase, it is provided that the sleeve and the carrying ring enter into a frictionally engaging holding connection. This prevents the two parts from coming apart. Therefore, the holding force can be dimensioned comparatively small so that no significant radial deformation of the sleeve occurs because of the holding connection.

A constructional variant of the holding connection is characterized in that the sleeve is supported radially at the carrying ring via a quantity of individual clamping blocks.

The clamping blocks are preferably arranged at an outer lateral surface of the collar of the sleeve because in a construction of this type there are no additional manufacturing steps which must be performed on the holding ring. The clamping blocks at the sleeve can be manufactured with the injection process for the sleeve without extra costs.

Further, the sleeve has a quantity of spring blocks via which the sleeve is axially clamped between the carrying ring and the piston rod guide. Accordingly, an axial relative movement between the cylinder and the sleeve will be prevented.

With regard to a high operating strength, the collar has an axial height which corresponds at least to the mean wall thickness of the sleeve.

Particularly in a vibration damper with a thin-walled cylinder, it is possible for the carrying ring to have a supporting sleeve which contacts the cylinder. The supporting sleeve strengthens the cylinder only in the region that is exposed to a particularly high compressive load.

The supporting sleeve of the carrying ring preferably contacts the cylinder on the outer side so that a sufficient installation space remains available on the inner side for the end stop.

BRIEF DESCRIPTION OF THE DRAWINGS

The invention will be described in more detail referring to the following description of the figures in which.

DETAILED DESCRIPTION OF THE PRESENTLY PREFERRED EMBODIMENTS

Figure 1:
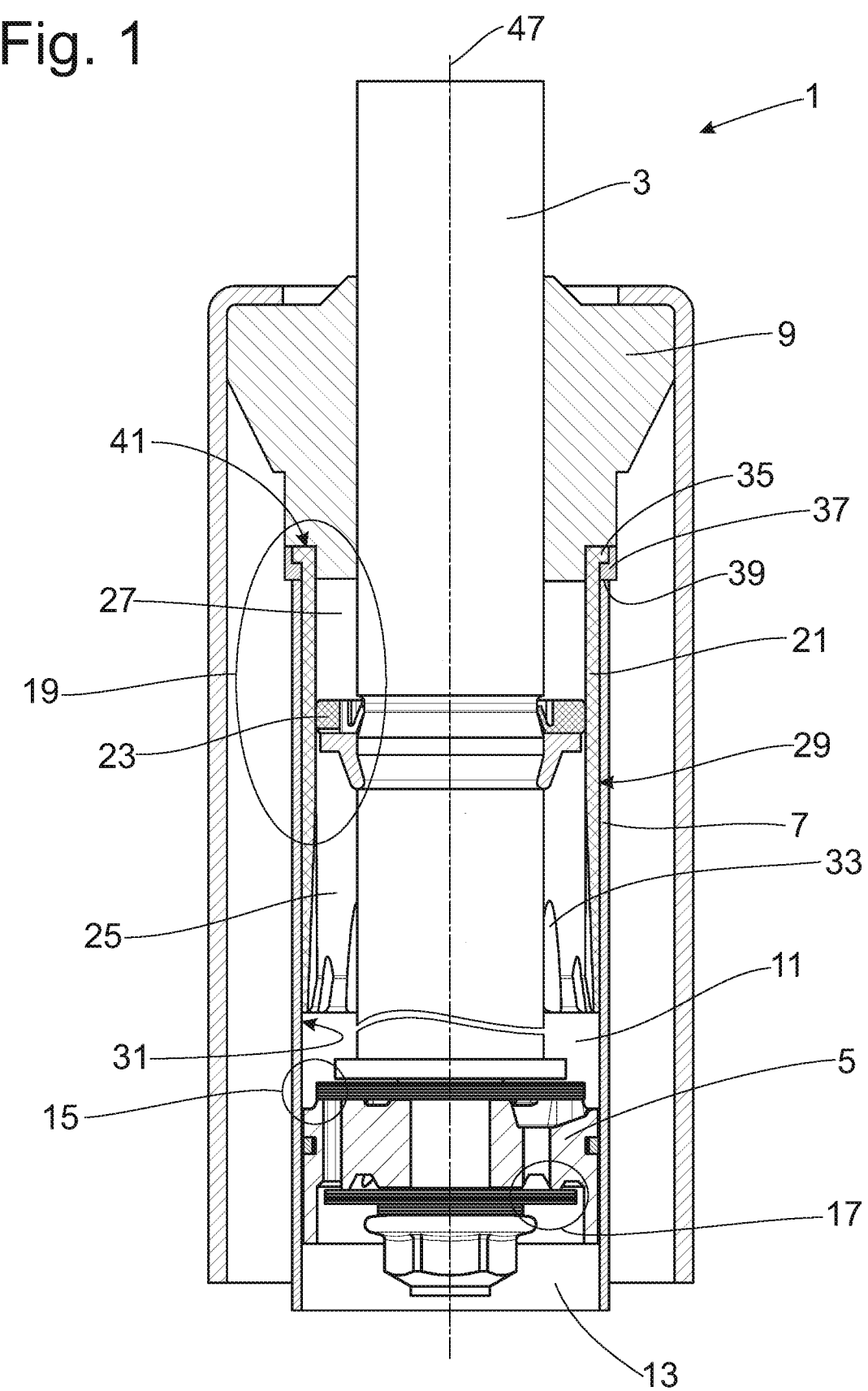
FIG. 1 is a sectional view of a vibration damper with hydraulic end stop.

FIG. 1 shows a vibration damper 1 in twin tube construction in which a piston rod 3 with a piston 5 is axially movably guided in a cylinder 7. A piston rod guide 9 which terminates the cylinder 7 at the end thereof is used for this purpose.

Piston 5 divides the cylinder 7 into a working chamber 11 on the piston rod side and a working chamber 13 remote of the piston rod. There is a hydraulic connection between the two working chambers 9; 11 via damping valves 15; 17 in the piston 5 during a movement of the piston rod.

For example, a hydraulic end stop 19 comprising a sleeve 21 which is fixed at the cylinder side and a displacer 23 on the piston rod side is formed in the working chamber 11 on the piston rod side. The displacer 23 is disclosed extensively in U.S. Pat. No. 9,593,697, the entire content of which is incorporated herein by reference so that a detailed description can be dispensed with because the dispenser 23 may also be constructed differently.

Sleeve 21 is made of plastic and forms a control space 25 which is separated by a displacer 23 to form a control chamber 27. This control chamber 27 is likewise limited by the piston rod guide 9. In principle, it would also be possible to arrange the sleeve 21 in the bottom area of the cylinder 7.

Sleeve 21 contacts an inner wall 31 of the cylinder 7 by its lateral surface 29 and is radially supported by the inner wall 31. Entry grooves 33 of different lengths which provide for a soft increase in force of the end stop 19 when the displacer 23 moves into the sleeve are formed in the sleeve 21 at the end facing in direction of the piston 5. At the end of the sleeve 21 facing in direction of the piston rod guide 9, the sleeve 21 has a circumferential collar 35 via which sleeve 21 is axially supported at the cylinder side.

Sleeve 21 is supported via the circumferential collar 35 directly on a carrying ring 37 which has an L-shaped cross section and is axially clamped between an end face 39 of cylinder 7 at the end thereof and an annular surface 41 of the piston rod guide 9 of the vibration damper 1.

Figure 2:
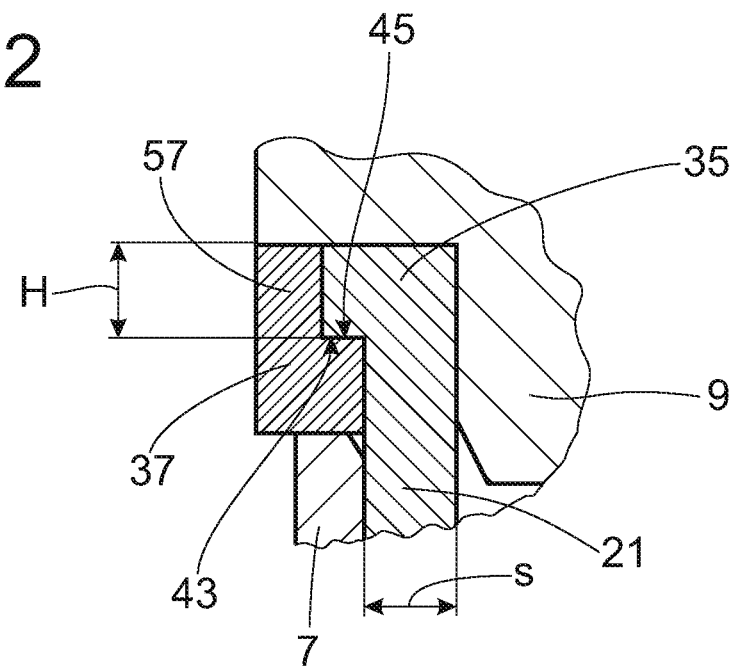
FIG. 2 shows a detail from FIG. 1.

As can already be seen in particular from FIG. 2, the collar 35 and the carrying ring have plane-parallel contact surfaces 43; 45. The contact surfaces 43; 45 extend substantially at right angles to the longitudinal axis 47 of the sleeve 21 and accordingly perpendicular to the longitudinal axis of the vibration damper 1 overall. The collar 35 of sleeve 21 has an axial height H which corresponds at least to the mean wall thickness S of sleeve 21. Accordingly, larger shear forces which act between the carrying ring 37 and the collar 35 can also be absorbed. The plane contact surfaces 43; 45 prevent the collar 35 from axially sliding out of the carrying ring 37. No resource-consuming contouring measures are needed at the cylinder 7 itself because the carrying ring 37 provides the relevant functional surfaces for the carrying function of the sleeve 21.

Figure 3:
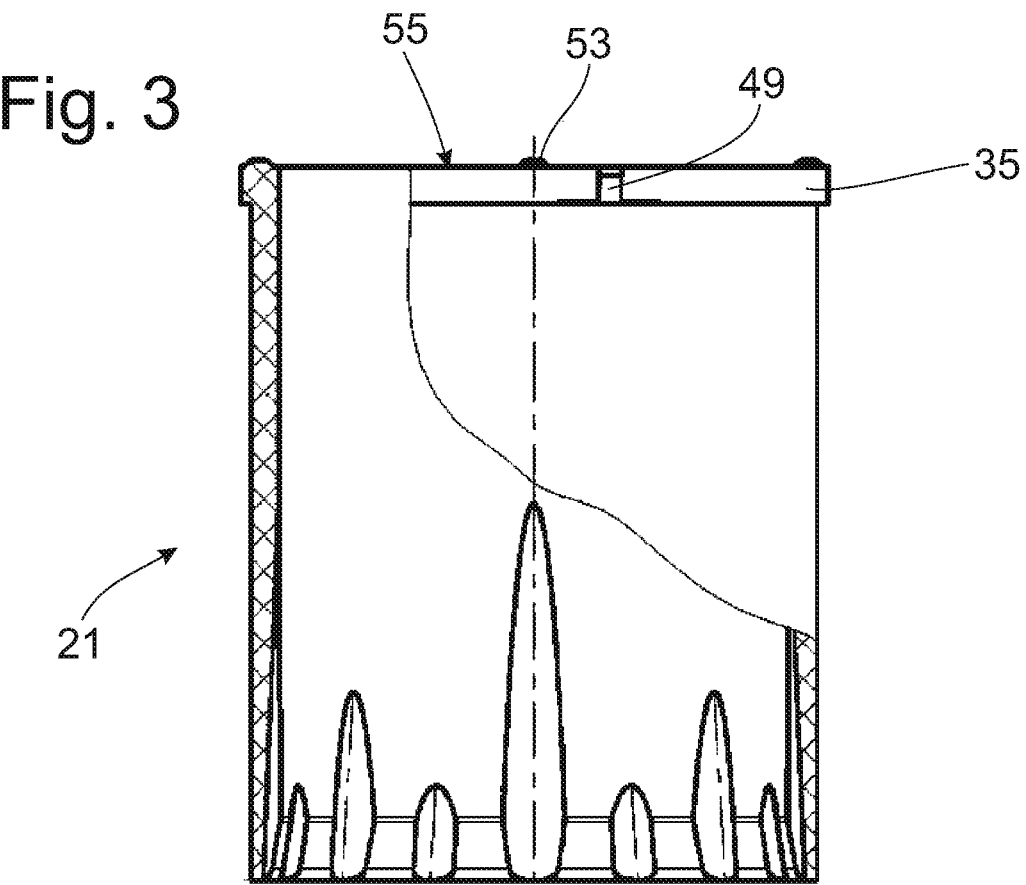
FIG. 3 shows a sleeve as detail part.

FIG. 3 shows the sleeve 21 as a detail part. Sleeve 21 and carrying ring 37 enter into a frictionally engaging holding connection. For this purpose, sleeve 21 is radially supported at the carrying ring 37 via a quantity of individual clamping blocks 49. In the detail shown in FIG. 5 as a section from the top view according to FIG. 4, it can be seen that clamping blocks 49 are arranged at an outer lateral surface 51 of the collar 35 of sleeve 21. At least three clamping blocks 49 are provided in order to achieve a centering of the two structural component parts 35; 37 relative to one another.

Figure 4:
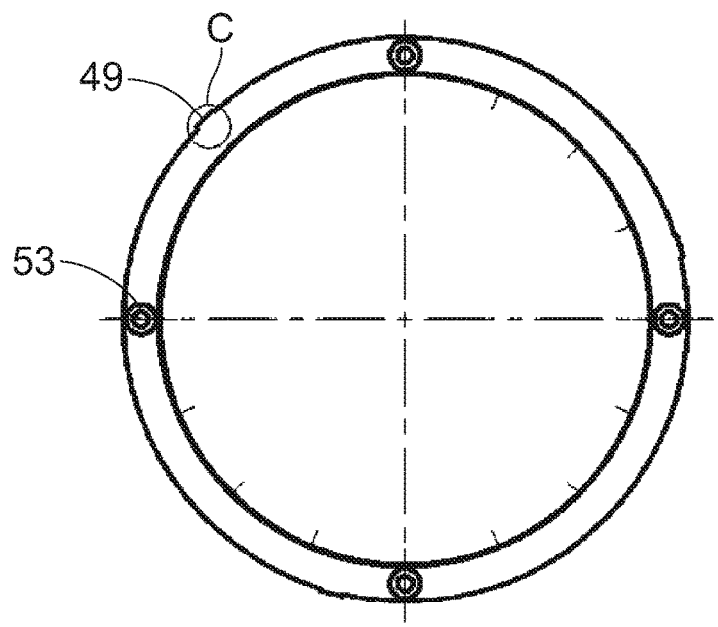
FIG. 4 is a top view of FIG. 3.
Figure 5:
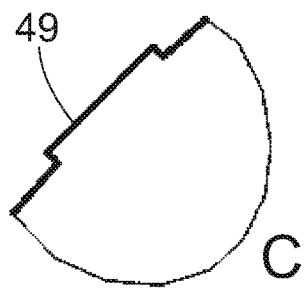
FIG. 5 shows a detail from FIG. 3.

When FIG. 3 and FIG. 4 are viewed in juxtaposition, it will be apparent that sleeve 21 has a quantity of spring blocks 53 which clamp sleeve 21 axially between the carrying ring 37 and the piston rod guide 9. The spring blocks 53 rise above an end face 55 facing in direction of the piston rod guide and have a conical cross section. In this case also, at least three spring blocks are used so that a skewed relationship cannot occur between the adjacent structural component parts via the clamping chain between the piston rod guide and the carrying ring. As their name suggests, the spring blocks 53 are springingly dimensioned so that a double fit cannot occur with a vertical leg 57 of the carrying ring 37 and the collar 35 between the end face 39 of cylinder 7 and the piston rod guide 9.

Figure 6:
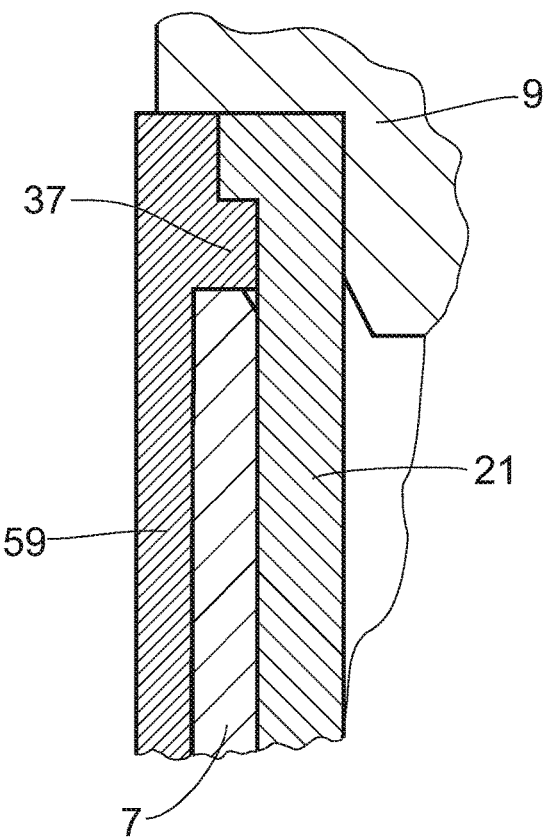
FIG. 6 is a carrying ring with supporting sleeve.

FIG. 6 shows a variant in which the carrying ring 37 has a supporting sleeve 59 which contacts the cylinder 7 on the outer side. This type of construction is particularly suitable when the cylinder 7 is optimized with respect to a thinnest possible wall thickness and the wall thickness would be too weak for the high pressures inside of the control chamber 27. The supporting sleeve 59 stabilizes the cylinder 7 so that, in spite of the supporting sleeve 59, there is still an advantage due to the smaller wall thickness of cylinder 7.

The supporting sleeve 59 of carrying ring 37 preferably contacts the cylinder 7 on the outer side so that the same displacer can always be used for one inner diameter size of cylinder 7 when the wall thicknesses of cylinder 7 differ.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:
1. A vibration damper comprising:
a hydraulic end stop including a cylinder;
a piston rod guide having an end face at an end of said cylinder;
a plastic sleeve having an outer side and a cylinder side and being axially fixed in said cylinder;
said plastic sleeve having a circumferential collar on said outer side and being axially supported at said cylinder side;
a carrying ring having an L-shaped cross section and being axially clamped between said end face at said end of said cylinder and said piston rod guide;
said plastic sleeve being supported via said circumferential collar directly on said carrying ring.
2. The vibration damper according to claim 1, wherein said collar and said carrying ring have contact surfaces extending in a plane-parallel manner.
3. The vibration damper according to claim 1, wherein said sleeve and said carrying ring enter into a frictionally engaging holding connection.
4. The vibration damper according to claim 3, wherein said sleeve additionally comprises a plurality of individual clamping blocks and wherein said sleeve is supported radially at said carrying ring via said plurality of individual clamping blocks.
5. The vibration damper according to claim 4, wherein said clamping blocks are arranged at an outer lateral surface of said collar of said sleeve.
6. The vibration damper according to claim 1, wherein said sleeve additionally comprises a plurality of spring blocks and said sleeve is axially clamped between said carrying ring and said piston rod guide via said plurality of spring blocks.
7. The vibration damper according to claim 1, wherein said collar has an axial height (H) and said sleeve has a mean wall thickness (S) and said axial height (H) corresponds at least to said mean wall thickness (S) of said sleeve.
8. The vibration damper according to claim 1, wherein said carrying ring additionally comprises a supporting sleeve contacting said cylinder.

9. The vibration damper according to claim 8, wherein said supporting sleeve of said carrying ring contacts said cylinder on said outer side.

* * * * *